March 20, 1962     H. A. STEINBERG     3,025,851
SOLAR OVEN
Filed June 19, 1958     2 Sheets-Sheet 1

INVENTOR.
HYMAN A. STEINBERG
BY *Mock & Blum*
ATTORNEYS

INVENTOR.
HYMAN A. STEINBERG
BY Mock + Blum
ATTORNEYS 3,025,851
SOLAR OVEN
Hyman A. Steinberg, 7—25 166th St., Whitestone, N.Y.
Filed June 19, 1958, Ser. No. 743,156
5 Claims. (Cl. 126—270)

This invention relates generally to solar ovens, wherein solar energy or radiation is adapted to be converted to heat.

It is one object of the present invention to provide a solar oven wherein is accomplished more efficient conversion of radiant energy to usable heat, and more efficient concentration of heat in the heat receiving area.

It is another object of the present invention to provide a solar oven having the advantageous characteristics mentioned in the preceding paragraph which is extremely simple and durable in construction, easily operated with a minimum of skill, portable, entirely safe and reliable in use, and which can be economically manufactured and sold.

Other objects of the present invention will become apparent upon reading the following specification and referring to the accompanying drawings, which form a material part of this disclosure.

This invention accordingly consists in the features of construction, combinations of elements, and arrangements of parts, which will be exemplified in the construction hereinafter described, and of which the scope will be indicated by the appended claims.

Figure 1:
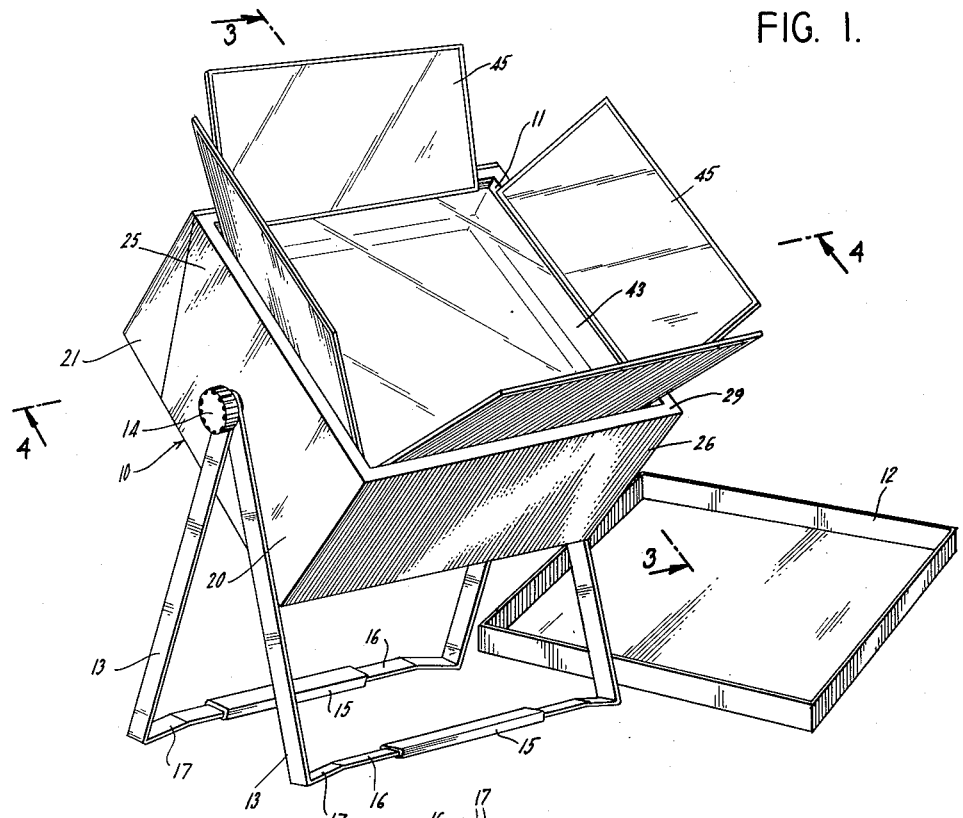
FIG. 1 is a perspective view illustrating a solar oven constructed in accordance with the present invention in an operative condition of use.

Referring now more particularly to the drawings, a casing of generally box-like configuration is there generally designated 10, having an opening 11 in one side and provided with a removable cover or lid 12. A pair of generally U-shaped members 13 are arranged exteriorly of the casing 10, each having its legs on respective opposite sides of the casing, with the distal ends of each adjacent pair of legs pivoted to the casing, as by a knob 14.

Figure 2:
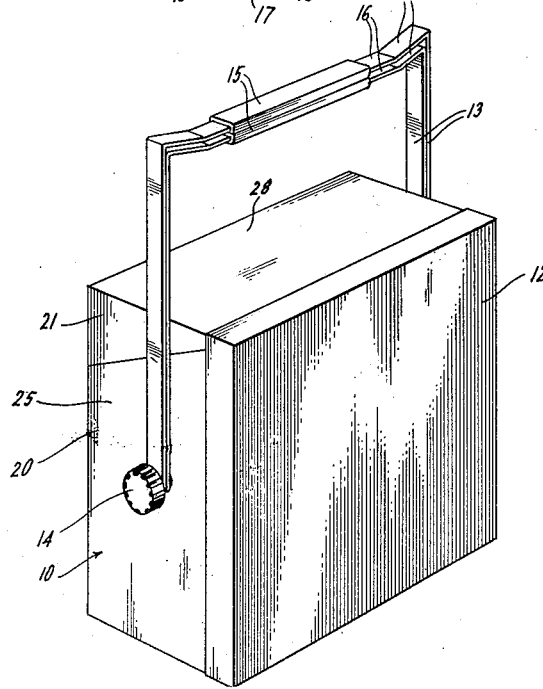
FIG. 2 is a perspective view showing the solar oven in an inoperative or non-use condition.

In FIG. 2 it will be noted that the U-shaped members 13 are of a relative size for coplanar disposition one within the other, in which relation they serve as a carrying handle or bail for the casing. Gripping sleeves 15, fabricated of plastic, leather, or any suitable material may be circumposed about the bite or medial portions of the U-shaped members 13 to facilitate manual gripping thereof and frictionally retain the U-shaped members in their coplanar relationship. In the condition of FIG. 1 it will be noted that the U-shaped members 13 are spread apart, and have their medial or bight portions 16 lowermost for supporting engagement with a ground surface. That is, the spread apart U-shaped members 13 in FIG. 1 serve as a stand or support for the casing 10. Further, the U-shaped members 13 have their bight portions 16 bent at opposite end portions 17 outward beyond the medial or intermediate regions of the bight portions for firm engagement with a supporting or ground surface.

The casing 10 is of generally rectangular tetrahedral configuration, being constituted of a main section 20 and an auxiliary section 21 hingedly connected, as by a hinge 22, to the main section. The casing 10 is formed of a metal shell containing insulating material 23 in all otherwise unused regions of the shell. More specifically, the metal shell of casing 10 includes a generally rectangular bottom wall 24, upstanding side walls 25, 26, 27 and 28 extending peripherally about the bottom wall, and a top wall 29 in which is formed the heretofore mentioned opening 11. The major and minor casing sections 20 and 21 are divided along a plane extending downward through the upper side or wall 29 contiguous to and intersecting with the upper wall along a line parallel to the side wall 28, such plane being disposed at approximately 30° to the latter side wall, and extending downward and away from said side wall for intersection with the bottom wall 24 along a line parallel to and spaced inward from the side wall 28. In parallelism with such subdividing plane, the major casing section is closed by a section wall 32 facing obliquely outward and downward, while the minor casing section 21 is closed at such plane by a section wall 33 facing obliquely upward and outward from the auxiliary section. The section walls 32 and 33 may be of balsam wood, or other suitable insulating material. Any suitable fastener means (not shown) may be employed to releasably retain the casing section 21 in its closed condition, as illustrated, relative to the casing section 20. A layer of glass wool, or other preferably resilient insulating material may be secured on the section wall 33 facing toward the section 20, as at 34; and, a retaining sheet of flexible plastic or the like having a heat reflecting surface, as at 35, may be secured over the insulating layer 34, for purposes appearing presently.

Figure 3:
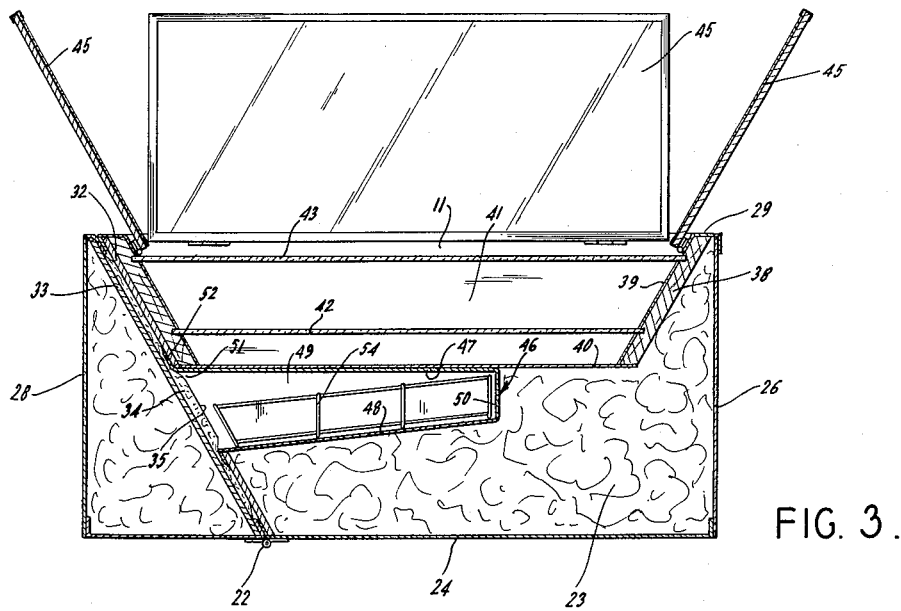
FIG. 3 is a sectional view taken substantially along the line 3—3 of FIG. 1.
Figure 4:
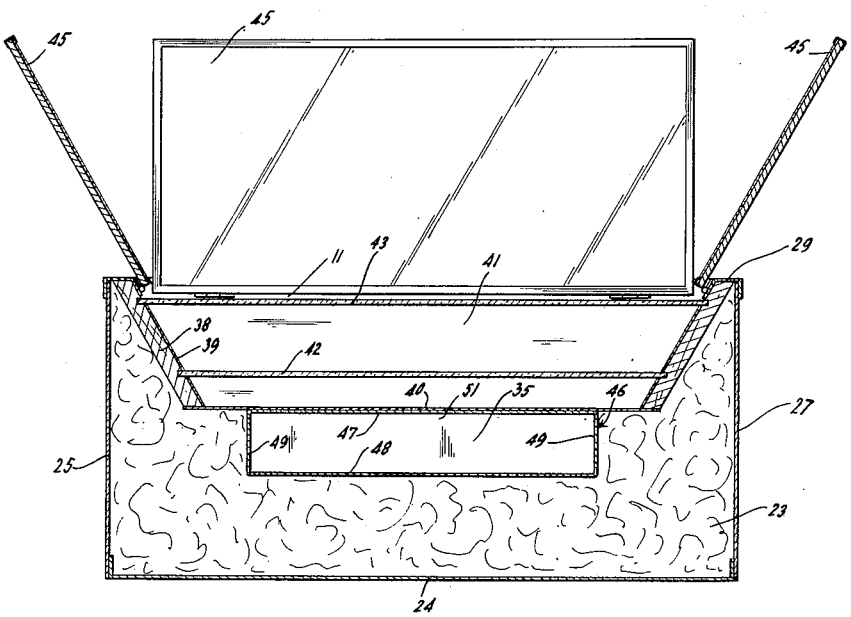
FIG. 4 is a sectional view taken substantially along the line 4—4 of FIG. 1.

Bounding the top wall opening 11 and extending inward from the top wall into the major casing section 20 are a plurality of internal walls 38, which may be fabricated of balsam wood or other good insulating material. The internal walls 38 are fixed in position in the casing 10 by any suitable means (not shown), and extend inward into the casing in convergent relation with respect to each other. Specifically, the four internal walls 38 bounding the rectangular opening 11 define a truncated pyramidal configuration, with the walls disposed at approximately 60° with respect to the top side of the casing. As best seen in FIGS. 3 and 4, the converging internal walls 38 underlie the top side opening 11, terminating at their lower edges in a substantially horizontal plane. On the inner surfaces of the internal walls 38 are provided reflective coatings or coverings 39. Secured to the lower edges of the internal walls 38 and extending entirely thereacross is a generally horizontal metallic collector plate 40, disposed in substantial parallelism with the bottom and top casing walls 24 and 29. The collector plate is advantageously black, either being painted black, or having a metallic oxide film deposited or electro-plated on the plate.

It will now be appreciated that the internal walls 38 and collector plate 40 combine to define a cavity 41 extending inward through the opening 11 between the internal walls 38 and terminating at its inner end at the collector plate 40. Fixed in the cavity 41 are a pair of horizontal, generally parallel spaced right transparent cover plates of glass or plastic 42 and 43, which each extend entirely across the cavity. The plates 42 and 43 are spaced from each other, and also spaced between the collector plate 40 and top wall 29. The plates 42 and 43 are thus parallel to the collector plate 40, and may be fabricated of any suitable light transmitting, air impervious material, and is substantially opaque to infra-red radiation.

Hingedly connected along each bounding edge of the top wall opening 11, adjacent to and outward of the outer transparent plate 43, is a generally rectangular light reflecting plate or mirror 45. That is, four mirrors 45 are hinged about the four sides of top wall opening 11, each mirror being of an area approximately equal to one half that of the opening, and one opposite pair of mirrors being hingedly connected at a slightly lower level than the other pair of opposed mirrors. By this construction and arrangement, one opposed pair of mirrors 45 may be swung to a closed position substantially completely overlying the outer light transparent cover plate 43, and the other opposed pair of mirrors 45 swung into substantially completely overlying relation with respect to the first mentioned mirrors. From this closed condition, the mirrors 45 may be swung to their open position, as illustrated, wherein the mirrors define substantially reflective extensions of the reflective internal surfaces 39, projecting outward beyond the top casing side 29 at substantially 60 degrees with respect to the latter. Any suitable means (not shown) may be employed to releasably retain the mirrors 45 in their closed and open positions.

In the closed condition of the mirrors 45, which was described in the preceding paragraph, the lid or cover 12 may be engaged over the top side or wall 29 of the casing 10, with its peripheral flange engaged about the side walls of the casing.

Interiorly of the casing 10, below and immediately adjacent to the collector plate 40, is a metal housing 46. The metal housing 46 has top and bottom walls 47 and 48, side walls 49, and end wall 50, the opposite end opening through the section wall 32, as at 51. The top housing wall 47 is substantially horizontal and in intimate contact throughout its entire extent with the undersurface of collector plate 40, while the remaining housing walls 48, 49 and 50 are externally in contact with the insulation 23. If desired the top wall 47 of the housing may be eliminated, and the collector plate 40 may serve as the housing top wall. In the drawings, it will be noted that the housing 46 is relatively shallow in the vertical direction, with the bottom wall 48 declining from the inner end wall 50 to the open end 51. A flange 52 extends about the open end 51 of the housing 46, being secured in facing engagement with the section wall 32 on the outer side thereof with respect to the main casing section 20.

In FIGS. 3 and 4 it may be observed that the top housing wall 47 is of an area appreciably smaller than that of the collector plate 40 and secured in contact with the latter over its entire area. Interiorly of the housing 46, in FIG. 3, is shown a food carrying grill 54, which is manually removable from the housing, and absent therefrom in FIG. 4.

Upon swinging opening movement of the auxiliary casing section 21 relative to the major casing section 20, it will be apparent that the housing 52 will have its end 51 open for manual access into the housing, as for inserting and removing the grill 54. However, in the closed condition, as illustrated, the resilient insulation 34 is compressed about the housing opening 51 by the flange 52, and thus provides a pressure sealed closure for the housing. Thus, the housing 46 may be considered as defining a cavity extending into the casing section 20 through one side thereof, the section wall 32; and, the casing section 21 may be considered as defining an openable closure for the cavity of housing 46 selectively affording manual access to the interior of the housing, when desired, as for inserting and removing the grill or food container from carrier 54.

In operation, solar radiation is received in the cavity 41, both by direct penetration through the transparent plates 43 and 42 to the black collector plate 40, and by reflection from the mirrors 45 and reflective surfaces 39, through the transparent plates to the collector plate. The collector plate is highly heat absorbent and retentive by reason of its composition and surface characteristics. The loss of heat away from the collector plate in undesirable ways is effectively minimized by the insulating material in direct contact with the collector plate, as the insulation 23 and walls 38. Further, radiation, conduction and convection of heat from the collector plate 40 in undesirable ways is effectively minimized by the relatively stagnant air spaces beneath the plates 42 and 43, and by the opaqueness to infra-red radiation character of such plates.

As appears in the drawings, the housing 46 or oven proper is in good heat receiving relation with respect to the collector plate 40, both by its proximity and direct contact over a substantial area, and also by the relatively shallow depth of the heat receiving housing or chamber 46. In the illustrated embodiment, the top wall 47 of the housing 46 is in contact throughout its entire area with the collector plates 40, for highly effective transfer of heat from the collector plate to the housing. As previously stated, if desired, the top wall 47 of the housing may be eliminated, and the collector plate 40 may serve as the housing top wall.

The food within the interior of the housing 46 receives heat from the collector plate 40 both by radiation and convection; and, the proportion of heat used in cooking to utilized and lost heat is advantageously increased by maintaining certain proportions. Taking into consideration the factor of cleaning the housing and the foregoing, it has been found that the area of the collector plate 40 which is in contact with or a part of the top wall of the housing 46 is advantageously between ¼ and ¾ the effective area of the collector plate. The effective area of the collector plate is that area exposed to receiving radiation. It has also been found that the volume, in cubic inches, of the housing 46 should be between .5 and 1.5 times the effective area, in square inches, of the collector plate.

In addition to the concentration of radiation by the various reflective surfaces to the collector plate 40, and the concentration of heat from the collector plate to the housing 46 by the relative proportions thereof, heat escape from the housing, as by evaporation and air movement is effectively reduced by the pressure sealing closure of the casing section 21 at the housing opening 51.

From the foregoing, it is seen that the present invention provides a solar oven which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A solar oven comprising, in combination, an insulated casing having an opening in one side; internal walls within said casing bounding said opening and extending inwardly therefrom in converging relation to each other, and terminating substantially short of the opposite side of said casing; a flat, black, and opaque collector plate extending between the inner ends of said internal walls and closing the space between said inner ends, said plate extending substantially parallel to the plane of said opening and being spaced substantially from said opposite side of said casing; the angle between said plate and each of said internal walls being substantially 120 degrees; said internal walls and said collector plate defining a cavity receiving radiation entering through said opening; the inner surfaces of said internal walls being light reflective to reflect, by virtue of their specific angular relation to said collector plate, all radiation impinging thereon solely to said plate; means defining a heat receiving chamber within said casing inwardly of and in heat receiving contiguous relation to said plate, and spaced from said opposite side of said casing; said heat receiving chamber being in contiguous relation with less than the entire area of said collector plate between said internal walls to amplify the relative transfer of heat from said collector plate to said heat receiving chamber; means providing access to said chamber through another side of said casing; and insulation within said casing and contiguous to the remainder of the inner surface of said collector plate and to the outer surface of said chamber.

2. A solar oven as claimed in claim 1 including a transparent plate extending between said inner walls parallel to said collector plate and positioned between said collector plate and said opening.

3. A solar oven as claimed in claim 1, in which said heat receiving chamber has a volume, in cubic inches, between 0.5 and 1.5 the effective area, in square inches, of said collector plate.

4. A solar oven as claimed in claim 1, in which said heat receiving chamber is located in contiguous relation with respect to between ¼ and ¾ the effective area of said collector plate, to amplify the relative transfer of heat from said collector plate to said chamber.

5. A solar oven as claimed in claim 1 including a plurality of reflective plates hingedly connected to said casing adjacent the outer ends of said internal walls for swinging movement between a closed position overlying said receiving cavity and a limiting open position in which the reflective surfaces of said plates extend at an angle of substantially 120 degrees to said collector plate.

References Cited in the file of this patent

UNITED STATES PATENTS

| | | |
|---|---|---|
| 412,725 | Calver | Oct. 15, 1889 |
| 681,095 | Baker | Aug. 20, 1901 |
| 965,391 | Little | July 26, 1910 |
| 1,074,219 | Skiff | Sept. 30, 1913 |
| 1,706,886 | Kiler | Mar. 26, 1929 |
| 2,842,044 | Kirk | July 8, 1958 |

OTHER REFERENCES

Telkes Publication 1 sht., Washington Post's Mag. Sec. Parade of April 18, 1954.